United States Patent Office 2,956,051
Patented Oct. 11, 1960

2,956,051

PROCESS FOR PREPARING CYCLIC AMIDES FROM AMINO ESTERS

Frederick Keith Duxbury and Owen Burchell Edgar, Manchester, England, assignors to Imperial Chemical Industries Limited, London, England, a corporation of Great Britain No Drawing. Filed Sept. 30, 1957, Ser. No. 686,872

Claims priority, application Great Britain Oct. 12, 1956

6 Claims. (Cl. 260—239.3)

This invention relates to the manufacture of amides, more particularly to a process for the manufacture of cyclic amides.

It is known that esters and amines can react together to form amides, for example on heating. When this reaction takes place, compounds containing two or more ester or amine groups in their molecules may give rise to a variety of products, most of which are of a polymeric nature.

We have now found that esters of certain amino acids may readily be converted into cyclic amides by heating the amino ester, in the vapour phase, and preferably in the presence of a dehydrating catalyst, to a temperature of about 250°–300° C.

Thus according to our invention we provide a process for the manufacture of cyclic amides which comprises heating an amino ester of the formula:

$$NH_2.R_1.CO.OR_2$$

wherein $R_1$ stands for a polymethylene radical containing 3 to 6 carbon atoms, which may optionally bear substituents, and $R_2$ stands for an alkyl or cycloalkyl radical, in the vapour phase, preferably in the presence of a dehydrating catalyst and/or water vapour, at a temperature between 250° and 300° C.

The heating may be carried out, conveniently by passing the vapours of the amino ester through a vessel containing the catalyst and heated to the desired temperature. The vapours of the amino ester may be at any convenient pressure, usually at substantially atmospheric pressure, and may optionally be diluted with inert gas, for example nitrogen; the particular pressure employed and the degree of dilution found to be most convenient will depend on the volatility of the particular aminoester used.

Advantageously, there may be mixed with the vapour of the aminoester a proportion of water vapour, since thereby the rate of reaction is increased. The proportion of water vapour may be up to 70% and preferably between 30% and 60% by weight of the amino ester.

The amino esters which may be used in the process of our invention include alkyl and cycloalkyl esters of ω-aminobutyric acid, ω-aminovoleric acid, ω-aminocaproic acid and ω-aminoenanthic acid, for example the methyl, ethyl, isopropyl and cyclohexyl esters.

The amino esters suitable for use in the process of our invention may be made by the catalytic hydrogenation of cyano esters, as described for example in our co-pending application Serial No. 686,857, or by esterification of the appropriate amino acids.

The dehydrating catalyst may be any solid material having catalytic dehydrating properties for example alumina or silica gel.

The cyclic amides produced by the process of our invention are of value as intermediates for the chemical synthesis, for example the manufacture of polyamides.

The process is particularly suitable for the manufacture of caprolactam from esters of ω-aminocaproic acid.

The invention is illustrated but not limited by the following examples in which the parts and percentages are by weight.

Example 1

70 parts of an aqueous solution containing 66% of isopropyl ω-aminocaproate is vaporised at the rate of 1.2 parts per minute, and the vapour is passed over 60 parts of activated alumina of 4–8 mesh maintained at a temperature between 250° C. and 275° C. Under these conditions the molecular ratio of amino ester to water is 1:5 and the contact time is approximately 5 seconds. After passing over the alumina, the reaction vapours are condensed by cooling and the condensed product is then fractionally distilled under reduced pressure.

27 parts of caprolactam (B.P. 132–4° at 9 mm. of mercury) are obtained. The yield is 90% of the theoretical.

Example 2

93.9 parts of an aqueous solution containing 66% of iso-propyl ω-aminocaproate are vaporised at the rate of 2.8 parts per minute, and the vapour is passed over 60 parts of activated alumina of 4–8 mesh maintained at a temperature between 310° C. and 333° C. Under these conditions the molar ratio of amino ester to water is 1:5 and the contact time is approximately 2 seconds. After passing over the alumina, the vapours are condensed by cooling and the condensed product is then fractionally distilled under reduced pressure.

24 parts of caprolactam (B.P. 140° C. at 13 mm. of mercury) are obtained, together with 5 parts of iso-propyl ω-aminocaproate. The yield of caprolactam is 60% of the theoretical.

Example 3

69.8 parts of an aqueous solution containing 66% of iso-propyl ω-aminocaproate are vaporized at the rate of 0.8 part per minute, and the vapour is passed over 80 parts of ⅛ inch Raschig rings maintained at a temperature between 250° C. and 275° C. Under these conditions the molecular ratio of amino ester to water is 1:5 and the contact time is approximately 7 seconds. After passing over the Raschig rings, the vapours are condensed by cooling and the condensed product is then fractionally distilled under reduced pressure.

5 parts of caprolactam (B.P. 132–4° C. at 9 mm. of mercury) together with 32 parts of iso-propyl ω-aminocaproate are obtained. The yield of caprolactam is 17% of the theoretical.

Example 4

33 parts of iso-propyl ω-aminocaproate are vaporised at the rate of 1.7 parts per minute, and the vapour is passed over 30 parts of activated alumina of 4–8 mesh maintained at a temperature between 250° C. and 275° C. Under these conditions the contact time is 7 seconds. After passing over the alumina, the vapours are condensed by cooling and the condensed product is then fractionally distilled under reduced pressure. 14 parts of caprolactam (B.P. 132–4° C. at 9 mm. of mercury) together with 8 parts of iso-propyl ω-aminocaproate are obtained. The yield of caprolactam is 65% of the theoretical.

59.6 parts of an aqueous solution containing 68% of sec-butyl ω-aminocaproate are vaporised at the rate of 1.2 parts per minute and the vapour is passed over 60 parts of activated alumina of 4–8 mesh maintained at a temperature between 250° C. and 275° C. Under these conditions the molecular ratio of amino ester to water is 1:5 and the contact time is approximately 5 seconds. After passing over the alumina, the vapours are condensed by cooling and the condensed product is then fractionally distilled under reduced pressure.

10 parts of caprolactam (B.P. 132–4° C. at 9 mm. of mercury) together with 15 parts of sec-butyl ω-aminocaproate are obtained. The yield of caprolactam is 41% of the theoretical.

What we claim is:

1. Process for the manufacture of cyclic amides which comprises heating an amino ester of the formula:

$$NH_2.R_1.CO.OR_2$$

wherein $R_1$ stands for a member of the group consisting of an unsubstituted polymethylene radical containing three to six carbon atoms, and a methyl-substituted polymethylene radical containing three to six carbon atoms, and $R_2$ stands for a member of the group consisting of lower alkyl radicals containing one to four carbon atoms and monocyclic alkyl radicals in the vapor phase at a temperature between 250° and 300° C., and in the presence of a solid possessing catalytic dehydrating properties, said solid being selected from the group consisting of alumina and silica gel, and thereafter recovering said cyclic amide from the resulting vaporized reaction mixture as the essential reaction product.

2. Process for the manufacture of cyclic amides as claimed in claim 1 wherein the heating is carried out in the presence of water vapour.

3. Process for the manufacture of cyclic amides as claimed in claim 2 wherein the proportion of water vapour is up to 70%, by weight of the amino ester.

4. Process for the manufacture of cyclic amides as claimed in claim 1 wherein the cyclic amide is caprolactam.

5. Process for the manufacture of cyclic amides as claimed in claim 3 wherein the proportion of water vapor is between 30% and 60% by weight of the amino ester.

6. A process for the manufacture of caprolactam which comprises vaporizing an aqueous solution of a lower alkyl ester of ω-aminocaproic acid in which the lower alkyl radical contains from one to four carbon atoms, passing said vapor in a molar ratio of ester to water of 1:5 over activated alumina at a temperature between 250 and 300° C., for a period of time between about 2 and 7 seconds, thereafter condensing said vapor by cooling and recovering caprolactam from the condensed product by fractional distillation.

References Cited in the file of this patent

UNITED STATES PATENTS 2,071,253     Carothers _____ Feb. 16, 1937

FOREIGN PATENTS 910,056     Germany _____ Apr. 29, 1954

OTHER REFERENCES

Karrer: Organic Chemistry (1950), p. 299, Nordeman Pub. Co., New York.